United States Patent Office 3,516,994
Patented June 23, 1970

3,516,994
5-NITRO-2-FURALDEHYDE 1 - (LOWER - ALKYL)-3-CARBOXY - 1,4 - DIHYDRO - 4 - OXO - 1,8-NAPHTHYRIDINE-7-HYDRAZONE
George Y. Lesher, Schodack, N.Y., assignor to Sterling Drug, Inc., New York, N.Y., a corporation of Delaware
No Drawing. Filed Oct. 2, 1967, Ser. No. 671,958
Int. Cl. C07d 31/42
U.S. Cl. 260—240                                           2 Claims

ABSTRACT OF THE DISCLOSURE 5-nitro-2-furaldehyde 1-(lower-alkyl)-3-carboxy-1,4-dihydro-4-oxo-1,8-naphthyridine-7-hydrazones, having antibacterial properties, are prepared by reacting 5-nitro-2-furaldehyde with a 1-(lower-alkyl)-3-carboxy-7-hydrazino-1,4-dihydro-4-oxo-1,8-naphthyridine.

---

This invention relates to 1,8-naphthyridine derivatives and to a process for their preparation.

The invention sought to be patented, in its composition aspect, resides in the class of compounds which I designate 5 - nitro - 2 - furaldehyde 1 - (lower - alkyl) - 3 - carboxy - 1,4 - dihydro - 4 - oxo - 1,8 - naphthyridine-7-hydrazones. These compounds have the structural Formula I

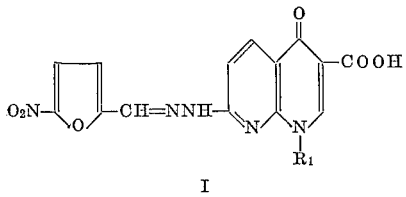

I where $R_1$ is lower-alkyl. The tangible embodiments of this composition aspect of the invention possess the inherent applied use characteristics of having antibacterial properties, as determined by standard bacteriological procedures.

The term "lower-alkyl," as used throughout this specification, e.g., as used in the definition for $R_1$ in Formula I, means alkyl radicals having from one to six carbon atoms which can be arranged as straight or branched chains, among which are, for purposes of illustration but without limiting the generality of the foregoing, methyl, ethyl, n-propyl, isopropyl, 2-butyl, n-hexyl.

The invention sought to be patented, in its process aspect, resides in the process for producing a 5-nitro-2-furaldehyde 1-(lower-alkyl)-3-carboxy-1,4-dihydro-4-oxo-1,8-naphthyridine-7-hydrazone which comprises reacting a 1-(lower-alkyl) - 3 - carboxy-7-hydrazino-1,4-dihydro-4-oxo-1,8-naphthyridine with 5-nitro-2-furaldehyde or a functional derivative thereof, e.g., its acetal, thioacetal, bisulfite or acetal diacetate.

The manner and process of making and using the instant invention will now be generally described so as to enable a person skilled in the art of chemistry to make and use the same, as follows:

The process aspect of the invention is conveniently carried out by heating the reactants, i.e., a 1-(lower-alkyl) - 3 - carboxy - 7 - hydrazino - 1,4 - dihydro - 4 - oxo-1,8-naphthyridine and 5-nitro-2-furaldehyde or functional derivative thereof. The reaction is preferably carried out using a suitable solvent, for example a lower-alkanol, e.g., methanol, ethanol, isopropyl alcohol; a lower-glycol, e.g., ethylene glycol, propylene glycol, diethylene glycol; dimethylsulfoxide; dimethylformamide; tetrahydrofuran; and the like. The preferred solvent was absolute ethanol. The reaction temperature is not critical and can be varied, e.g., about 50 to 150° C., preferably between about 60 to 100° C. The intermediate 1-(lower-alkyl) - 3 - carboxy - 7 - hydrazino - 1,4 - dihydro - 4 - oxo-1,8-naphthyridine was used preferably in the form of its acid-addition salt, e.g., hydrochloride, which was converted to its free base form prior to use by neutralization with a small quantity of acid, e.g., acetic acid.

The intermediate 1-(lower-alkyl)-3-carboxy-1,4-dihydro-4-oxo-1,8-naphthyridine-7-hydrazones are generally known compounds prepared by known methods. For example, 3 - carboxy-1-ethyl-7-hydrazino-1,4-dihydro-4-oxo-1,8-naphthyridine as its hydrochloride is prepared by reacting 7 - chloro-1-ethyl-1,4-dihydro-4-oxo-1,8-naphthyridine-3-carboxylic acid with hydrazine hydrate. 1-(lower-alkyl) - 7 - chloro - 1,4 - dihydro - 4 - oxo - 1,8 - naphthyridine-3-carboxylic acids are prepared by the following series of reactions: 2,6-diaminopyridine is reacted with diethyl ethoxymethylenmalonate to prepare diethyl N-(6-amino-2-pyridyl)aminomethylenmalonate; the latter is heated at about 250° C. in a suitable solvent, e.g., mineral oil or diethyl phthalate containing acetic anhydride to yield ethyl 7-acetamido-4-hydroxy-1,8-naphthyridine-3-carboxylate; reaction of the latter compound with the appropriate lower-alkyl halide yields the corresponding ethyl 7-acetamido-1-(lower-alkyl)-1,4-dihydro-4-oxo-1,8-naphthyridine-3-carboxylate, e.g., using methyl iodide, ethyl iodide, n-propyl iodide, isobutyl bromide or n-hexyl bromide yields the corresponding 1-methyl, 1-ethyl, 1-n-propyl, 1-isobutyl or 1-n-hexyl-1,8-naphthyridine; hydrolyzing said esters by treating them with an aqueous hydrochloric acid yields the corresponding 7-amino-1-(lower - alkyl) - 1,4 - dihydro-4-oxo-1,8-naphthyridine-3-carboxylic acid hydrochloride where lower-alkyl is methyl, ethyl, n-propyl, isobutyl or n-hexyl; said 7-amino-1,8-naphthyridines are converted to the corresponding 7-hydroxyl-1,8-naphthyridines by first reacting each with aqueous sulfuric acid and sodium nitrite at 0° C. and then treating the reaction mixture with boiling water to obtain the 1-(lower-alkyl)-1,4-dihydro-7-hydroxy-4-oxo-1,8-naphthyridine-3-carboxylic acid where lower-alkyl is methyl, ethyl, n-propyl, isobutyl or n-hexyl; and, said 7-hydroxy-1,8-naphthyridines are converted to the corresponding 7-chloro-1,8-naphthyridines by reaction with phosphorus oxychloride to yield, the 1-(lower-alkyl)-7-chloro - 1,4 - dihydro - 4-oxo - 1,8 - naphthyridine - 3-carboxylic acid where lower-alkyl is respectively methyl, ethyl, n-propyl, isobutyl or n-hexyl.

Also within the scope of the invention are cationic salts of the above described 5-nitro-2-furaldehyde 1-(lower - alkyl) - 3 - carboxy - 1,4 - dihydro - 4 - oxo - 1,8-naphthyridine-7-hydrazones. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts. Although medicinally acceptable salts are preferred, other and all cationic salts are within the scope of our invention. All such salts, including those having toxic cations, are useful in characterizing the free acids and as intermediates in purification of the free acids. The salts are prepared from the acids using generally known methods of preparing salts from carboxylic acids.

The molecular structures of the compounds of the invention were assigned on the basis of study of their infrared and NMR spectra, and confirmed by the correspondence of calculated and found values for the elementary analysis for representative examples.

The 5-nitro-2-furaldehyde 1-(lower-alkyl)-3-carboxy-1,4-dihydro-4-oxo-1,8-naphthyridine-7 - hydrazones when tested according to standard in vitro bacteriological evaluation procedures were found to have antibacterial activity, for example, against *Staphylococcus aureus, Eberthella* coli and *Pseudomonas aeruginosa*, at test concentration levels of about 1 to 100 mcg./cc. as illustrated hereinbelow.

The best mode contemplated for carrying out the invention will now be set forth as follows:

5-nitro-2-furaldehyde 3-carboxy-1-ethyl-1,4-dihydro-4-oxo-1,8-naphthyridine-7-hydrazone is prepared as follows: Dissolve 19.9 g. of 3-carboxy-1-ethyl-7-hydrazino-1,4-dihydro-4-oxo-1,8-naphthyridine hydrochloride in a hot solution containing 100 cc. of absolute ethanol and 20 g. of sodium acetate. Add to the solution 2 cc. of acetic acid and then 14.1 g. of 5-nitro-2-furaldehyde. Heat the reaction mixture on a steam bath for 1 hour and then cool it in an ice bath. Collect the resulting precipitate and recrystallize it once from dimethylsulfoxide using decolorizing charcoal and then recrystallize it a second time from dimethylsulfoxide. Grind it to a finely divided powder and dry it for three days in a vacuum oven at about 100° C. to yield, as a yellow-gold solid, 5-nitro-2-furaldehyde 3-carboxy-1-ethyl-1,4-dihydro-4-oxo-1,8-naphthyridine-7 - hydrazone, M.P. >300° C.

*Analysis.*—Calcd. for $C_{16}H_{13}N_5O_6$ (percent): C, 51.75; H, 3.53; H, 18.86. Found: (percent) C, 51.74; H, 3.60; N, 18.87.

The potassium salt of 5-nitro-2-furaldehyde 3-carboxy-1 - ethyl - 1,4 - dihydro - 4 - oxo - 1,8 - naphthyridine - 7-hydrazone is prepared by stirring a solution of 5-nitro-2-furaldehyde 3-carboxy-1-ethyl-1,4-dihydro-4-oxo-1,8-naphthyridine-7-hydrazone in pyridine with a solution of potassium hydroxide in methanol, collecting the precipitated potassium salt, washing it with ether and drying it in vacuo at 80° C.

5-nitro-2-furaldehyde 3-carboxy-1-ethyl-1,4-dihydro-4-oxo-1,8-naphthyridine-7-hydrazone when tested according to standard in vitro bacteriological evaluation procedures was found to have bacteriostatic activity at concentrations of 2.5, 75 and 100 mcg./cc., respectively, against *Staphylococcus aureus, Eberthella coli*, and *Pseudomonas aeruginosa*.

Following the above-described procedure using in place of 3 - carboxy-1-ethyl-7-hydrazino-1,4-dihydro-4-oxo-1,8-naphthyridine hydrochloride the appropriate 1-(lower-alkyl) - 3 - carboxy - 7 - hydrazino - 1,4 - dihydro - 4 - oxo-1,8-naphthyridine hydrochloride, the corresponding 5-nitro-2-furaldehyde 1 - (lower-alkyl)-3-carboxy-1,4-dihydro-4-oxo-1,8-naphthyridine-7-hydrazones are obtained: 5-nitro-2-furaldehyde 3-carboxy-1,4-dihydro-1-methyl-4-oxo-1,8-naphthyridine-7-hydrazone, 5-nitro-2-furaldehyde 3-carboxy - 1,4 - dihydro - 4 - oxo - 1 - n - propyl - 1,8-naphthyridine-7-hydrazone, 5-nitro-2-furaldehyde 3-carboxy - 1,4 - dihydro - 1 - isobutyl - 4 - oxo - 1,8 - naphthyridine-7-hydrazone, and, 5-nitro-2-furaldehyde 3-carboxy - 1 - n - hexyl - 1,4 - dihydro - 4 - oxo - 1,8 - naphthyridine-7-hydrazone.

I claim:
1. 5-nitro-2-furaldehyde 1-(lower-alkyl)-3-carboxy-1,4-dihydro-4-oxo-1,8-naphthyridine-7-hydrazone.
2. 5-nitro-2-furaldehyde 3-carboxy-1-ethyl-1,4-dihydro-4-oxo-1,8-naphthyridine-7-hydrazone according to claim 1 where lower-alkyl is ethyl.

References Cited

UNITED STATES PATENTS 3,149,104   9/1964   Lesher et al. _____ 260—240

OTHER REFERENCES

Chemical Abstracts, vol. 41, cols. 1225 to 1226 (1947) (abstract of Mangini et al.).

Miura et al., Progress in Medicinal Chemistry, vol. 5, pp. 322 to 325, Butterworths, London, England (1967).

JOHN D. RANDOLPH, Primary Examiner

U.S. Cl. X.R.

260—296; 424—263